(12) United States Patent
Bonzi

(10) Patent No.: US 11,507,066 B2
(45) Date of Patent: Nov. 22, 2022

(54) METHOD AND APPARATUS FOR THE AUTOMATED MANAGEMENT OF A COATING PLANT

(71) Applicant: CEFLA Societá Cooperativa, Imola (IT)

(72) Inventor: Giancarlo Bonzi, Imola (IT)

(*) Notice: Subject to any disclaimer, the term of this patent is extended or adjusted under 35 U.S.C. 154(b) by 505 days.

(21) Appl. No.: 16/500,361

(22) PCT Filed: Apr. 6, 2018

(86) PCT No.: PCT/IB2018/052394
§ 371 (c)(1),
(2) Date: Oct. 2, 2019

(87) PCT Pub. No.: WO2018/185717
PCT Pub. Date: Oct. 11, 2018

(65) Prior Publication Data
US 2021/0116892 A1  Apr. 22, 2021

(30) Foreign Application Priority Data
Apr. 7, 2017 (IT) .................. 102017000038298

(51) Int. Cl.
*G05B 19/418* (2006.01)

(52) U.S. Cl.
CPC ..... *G05B 19/4185* (2013.01); *G05B 19/4183* (2013.01); *G05B 19/41815* (2013.01);
(Continued)

(58) Field of Classification Search
CPC .......... G05B 19/4185; G05B 19/41815; G05B 19/4183; G05B 2219/23161;
(Continued)

(56) References Cited

U.S. PATENT DOCUMENTS

2014/0025992 A1* 1/2014 DeRoos .............. G06F 11/0748
714/25
2014/0085309 A1* 3/2014 Czapar ................... G06F 3/147
345/441

(Continued)

FOREIGN PATENT DOCUMENTS

| EP | 2077473 | 7/2009 |
|---|---|---|
| WO | 2016103064 | 6/2016 |
| WO | 2016179377 | 11/2016 |

*Primary Examiner* — Christopher E. Everett
(74) *Attorney, Agent, or Firm* — Themis Law

(57) ABSTRACT

A plant for manufacturing products, in particular for applying a coating on parts, includes apparatuses having radiofrequency transmitters, with a pre-set periodicity, of a radio signal containing a unique identifier of each apparatus; a portable device carried by an operator and receiving the radio signal; a program loaded on and performed by the portable device to extract a unique identifier of the apparatus and detect the operator-apparatus distance through an analysis of the trend of the radio signal, the radio-transmitters transmitting periodically their unique identifier and having a remote configuring/setting channel through radio-frequency communication with an external control device to exchange data packets; and a connecting procedure between the portable device and the radio-frequency transmitter to receive information on the operating status of the apparatuses, the signals being transmitted to a remote server or a cloud to monitor the operating conditions of the apparatuses.

18 Claims, 8 Drawing Sheets

Figure 1:
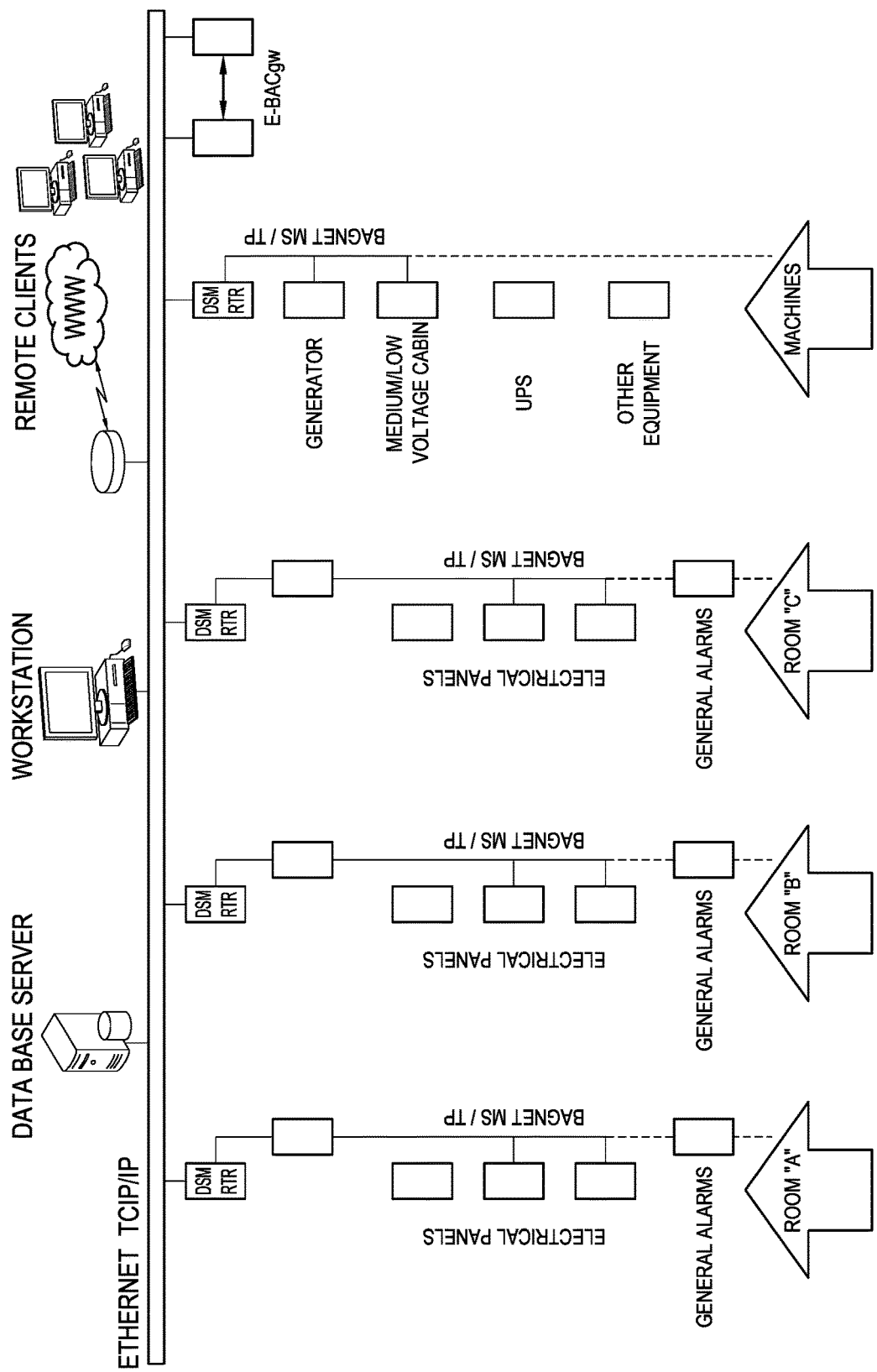

(52) U.S. Cl.
CPC .............. *G05B 2219/23161* (2013.01); *G05B 2219/23363* (2013.01); *G05B 2219/24012* (2013.01)

(58) Field of Classification Search
CPC ........... G05B 2219/23363; G05B 2219/24012; G05B 19/418; Y02P 90/02
See application file for complete search history.

(56) References Cited

U.S. PATENT DOCUMENTS

2015/0302159 A1* 10/2015 Casse ................. G06F 16/9554
    705/2
2017/0371322 A1* 12/2017 Lake ......................... G01S 5/00
2019/0156166 A1* 5/2019 Karthikeyan .... G06K 19/06028

* cited by examiner

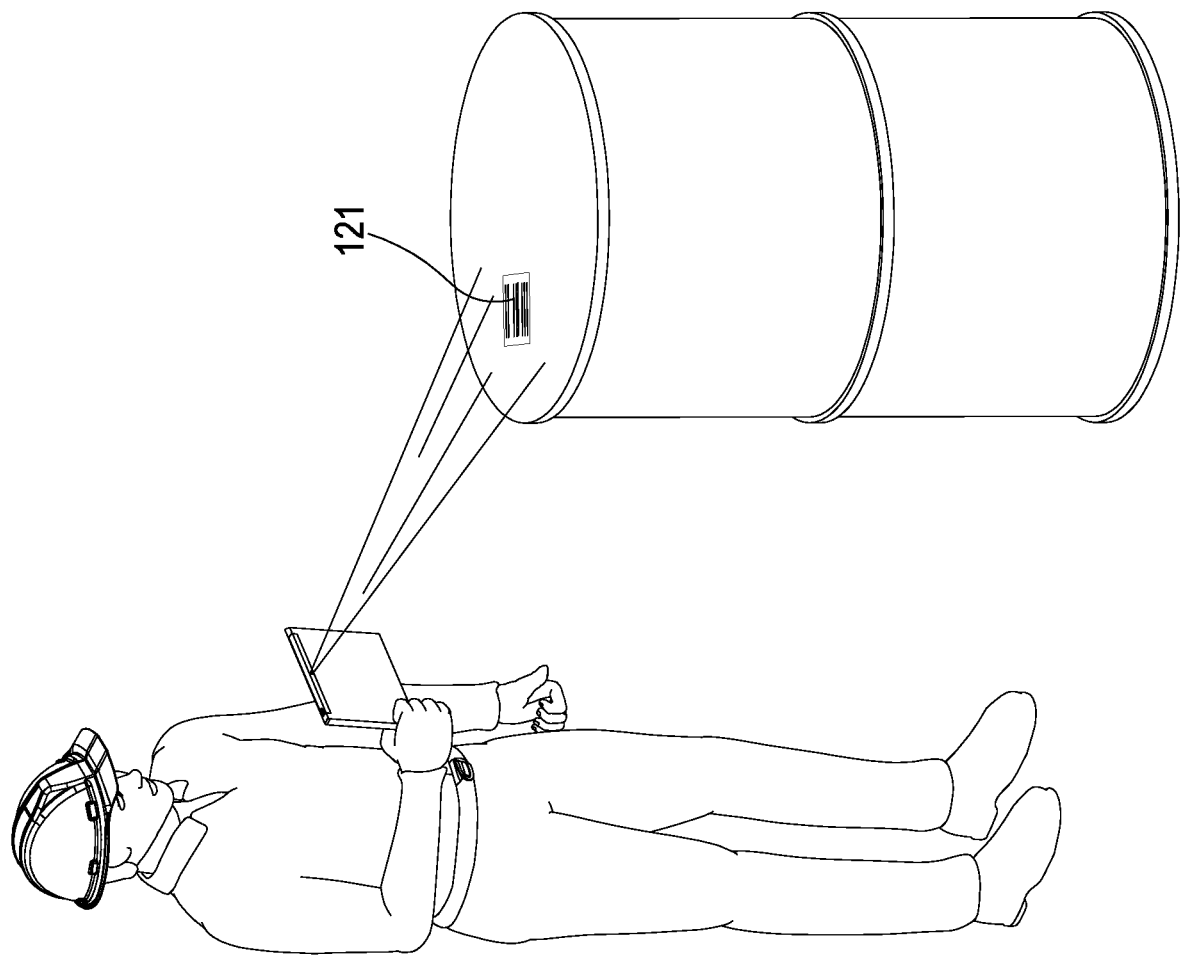

METHOD AND APPARATUS FOR THE AUTOMATED MANAGEMENT OF A COATING PLANT

The present invention relates to the technical field of command and control of the machines in a production line. The following description relates to the technical field of the machines for the application through spraying of a coating to products, without for this losing generality. In a production line for applying a coating to parts, such machines are normally employed in a production line comprising sundry apparatuses, usually arranged in series. In particular, the present invention relates to a method and an apparatus for gathering information on the productive process under course.

In the instant description, the word coating is used as a generic term, comprising enamel, lacquer, paint, inks, transparent coats, base coats, adhesives and glues, and in general any sprayable substance having an organic base.

The pieces to be coated are preferably, but not exclusively, panels having two main dimensions, made of wood, plastics, glass, fibrocement, or any other material.

In the art, automated islands for applying a coating, with robots having visual sensors to detect the dimensions and the positioning of products. Often these coating islands are totally isolated from the data stream of the rest of the factory.

In the state of the art, the interfacing of the coating island requires an important and careful design of data interfaces.

To oversee the plant and gather information about the state of production progress, the most used architecture consists in interfacing every single apparatus with a concentrator (hub), which in its turn is part of the company network iec 802.3 or iec 802.11, and from there is connected to different servers and industrial applications or to Internet through suitable firewalls.

A concentrator (hub) is a monitoring system gathering the information coming from the PLC/PC of the single apparatuses, often through a web connection through Ethernet or Wi-Fi.

A drawback of this type of architecture is that the implementation of this system requires a careful design of the database, an exchange of data among the different managers of Information Technology, and normally also a significant investment in hardware, time of qualified professionals, travels, meetings and different kinds of resources.

Furthermore in plants comprising in combination several automatic machines carrying out different tasks of a complex workflow of the production process, which machines are often built by different producer. Upgrade or maintenance operations of such a plant causes often that some of the machines operating in combination are upgraded to a new and more modern technological level which is not directly compatible with one or more of the older machines. In many cases also an upgrade or modification of the production process due to changes in the kind of the product or upgrades or changes in some materials used during the production process or changes in the technology used for controlling the process and/or interfacing the machines causes hindering or complex problems in harmonization and integration of the upgrade.

These conditions are extreme when considering the processing units controlling the workflow and configurations of the corresponding machine and the compatibility of the hardware and the software resources available on each machine with centralized process management units. This is true at the hardware level and at the software level and it is also frequent the case that the hardware of a machine is not able to execute upgraded software. These problems also attain to the hardware and software for connecting the machine control units in a network allowing a centralized monitoring of the machines and a centralized management of the production process.

The most modern coating islands are provided with systems detecting the dimensions and positioning of parts to be coated, and can autonomously set up coating trajectories: this has the advantage of simplifying the interfacing needed to provide parts dimensions and their layout.

Nonetheless, such systems work as islands separated from the rest of the factory, at least for their functional part. They cannot provide the management of production information, industrial accounting and final accounting.

In a significant number of industrial plants, having obtained a minimal functionality of the production line, the buyers prefer to save on the investments, and do not buy the interfacing of databases.

Other buyers of plants decide however to interface data for data gathering and monitoring, reluctantly accepting to bear a considerable additional cost, not justified by the production line working criteria, but by management control only.

A first aim of the present invention relates to providing a simplification of the integration of a plurality of machines into a centralized management system pf the production process.

Aim of the present invention is providing an apparatus and a method for the automated management of a coating plant, allowing a simplification of data interfacing.

According to a first aspect of the present invention the above objects are achieved by an apparatus and a method having the features of the embodiments comprising the combination of features of the independent claims. Advantageous embodiments and refinements are specified in claims dependent thereon.

The features of the above embodiments and the advantages will appear more clearly from the following description The present invention allows to enrich the operation of users (e.g. operators, service providers, administrative foreperson, etc.) of the production line with precious information concerning production line operation, productivity, safety, etc.

In a first embodiment, the invention according to the present invention comprises:
  Any number of apparatuses, each provided with a transmitting radiofrequency device, transmitting with a predetermined periodicity a radio signal containing a unique identifier, allowing to recognize the apparatus itself,
  A portable device receiving the signals transmitted from the transmitting device embedded in the apparatus provided with a program (app) performed by said portable device, extracting the unique identifier of the apparatus, detecting its distance through the analysis of the intensity of the radio signal and radio-transmitting said information and/or a dedicated command signal for activating/configuring for each of the single apparatus, connecting to each of said apparatus.

According to an advantageous embodiment, the radio-transmitting device is a so-called beacon in a modified version, comprising a section radio-transmitting signals according to one of the different known communication protocols, a control processor by which a control program of the functions of the beacon itself is performed, a memory in which said control program is loaded, a radio receiving port for configuring/setting signals, through which an external device transmits configuring/setting parameters of the beacon to the control processor, and at least an output port of said processor. According to said embodiment, the radio receiving port is used to transmit the information and/or the command signals generated by the portable device to the beacon, while in its memory a communication program is loaded; said program commands and/or configures signals, which program is performed by the processor for actuating the information and/or the command signals commanded by the portable unit to said adjusting and control device of the apparatus making part of the production line.

According to the present invention, in the plant there is provided a plurality of beacon sensors, each characterized by its unique identifier, emitting information visible from all the personal devices of the operators inside a pre-defined area. The beacon sensors allow to correctly localize the personal devices (smartphone, table, or other, even wearable, devices) of operators on which an app with location based function is loaded. Furthermore by combining the beacon identifier with a machine identification code it is possible to univocally correlate the operations of the portable device in cooperation of a certain beacon with the corresponding apparatus.

On the market there are provided several commercial electronic modules, known as beacons. A Bluetooth® beacon transmits with a pre-determined periodicity a 2.4 GHz radio signal according to the Bluetooth® standard, containing a unique identifier for each device in a codified way according to the Bluetooth® standard. Analogously, a Wi-Fi beacon transmits with a pre-determined periodicity a radio signal according to the IEEE 802.11 standard, containing a unique identifier for each device in a codified way according to IEEE 802.11 standard.

From the above, it appears clearly that the improper use of the radio connection channel for configuring the beacon as a channel for transmitting command signals generated by the control program performed by the portable device allows reducing the hardware placed in the single lighting devices, with respect to what would be needed according to the known art. Concentrating hardware/software intelligence in the portable device, a very light communication program is obtained between beacon and apparatuses, in that the hardware must not perform processes transforming the identifying information of the apparatus, of the intensity of the signal received from the portable device and distance from said apparatus, and information concerning apparatus conditions, operation performed by operators and use of consumables, etc. . . . The hardware must only actuate the configuring and command signals intelligibly received by the apparatus on the actuating device. If the tracking of working data of apparatus must be changed, distributing software updates will be sufficient, without the need to modify the hardware of the plant.

Designing and building industrial beacons provided with sensors, like e.g. thermometers, vibration sensors, magnetometers, etc. is also possible, so that said beacons acquire their values and their variations at pre-defined intervals or upon an event. Said beacons can diffuse at each sent message a portion of the measurements, or make available the complete measurements or the log of measurements when the portable device explicitly connects to the beacon.

Moreover, generating a network among apparatuses for applying coating making part of the production line is not necessary, because the control software performed by the portable device manages the communication with the different apparatuses, correspondingly to pre-configured or pre-configurable modes, according to the user needs, to whom a portable device is associated.

Independent claims 12 and 21 disclose a further embodiment of the present invention which allows easily to carry out in an easy and rapid way monitoring operations of an automatic operating unit by avoiding manual input of the functional parameters describing the working status of the apparatus in a program for determining commands or control configurations for changing the workflow of the apparatus and/or one or more configuration parameters of the apparatus, having the advantage that the apparatus control unit does not need to be connected to a physical or wireless network for transmitting data to a central processor for generating the said commands and/or configuration controls basing on the parameters sent to the central processor by the apparatus and for transmitting the said generated commands and/or configuration controls as well as other information to the control unit of the apparatus and/o to the operator through the said control unit and the associated display.

According to the embodiment defined by the combination of features of independent claims 12 and 21, also apparatus having very limited resources relating to the hardware of the control unit and to the capability of this hardware to be connected in a network and/o to carry out software may be easily monitored by the most technologically evolved management systems without the need of upgrade interventions on the apparatus and without needing complex upgrade process or the development of dedicated software for exploiting the existing hardware resources of the less developed apparatus which may still be used for carrying out some of the new tasks such as connection to a network or interfacing with management data such as commands and controls and their configuration and protocols.

As it appear clearly if needed the communication and connection with a centralized monitoring and management server is limited to the portable devices not being essentially needed a direct connection of these portable devices with the control hardware of the apparatus. Thus also when several apparatus are present which has to work in a cooperative manner in a production line, there is not the need to generate a network connecting directly this apparatus to a central monitoring and management server. This eliminates every problem in relation to retrofitting of older apparatus.

According to the further aspect disclosed in the dependent claims, this embodiments allow to integrate easily and without high burden in costs and technological complexity existing apparatus with sensors and devices which allow to integrate the monitoring or information which can be made available by the original native configuration of the control hardware and software of the apparatus, thus overcoming any upgrade or retrofitting problem and any compatibility problem.

When the existing hardware resources in an apparatus allow to generate a direct communication connection with a radio-transmitting device such as the beacon, it is possible to easily transfer data from and to the control unit of the apparatus using the radio-transmitting device as a communication unit and the portable unit as a gateway to the cloud server, which gateway is also particular since the radio-transmitting device operates blindly according to a transmission and reception protocol, while all the process is managed by the portable device.

In the following further advantages of the invention are disclosed.

A first advantage of the present invention is that said app can be the same for a plurality of coating plants, sold to different plant buyers and placed in completely different geographical regions.

A second advantage is that data flow from the production plant to a remote server takes place only when beacon sensors were previously enabled. Heavy interfacing with the enterprise resource program are not necessary any more, with an important saving.

A third advantage is that with the same instruments the supply of raw materials to production line can be detected, crossing it with the progress of production orders and with the progress of apparatus statistics.

A fourth advantage is that with the same instruments, context-aware contents delivery is possible: e.g. an operator can access the user manual of the apparatus when she/is in proximity of the apparatus itself; she/he can access to the consumables list of an apparatus when being in proximity of the apparatus itself.

A fifth advantage is that, in case of emergency, every app can triangulate the information of the emergency underway, with the supplementary advantage of the possibility of individuation of the persons present at the moment of the emergency. On one hand, this can help remote diagnostics, on the other knowing whether other persons were in the area, or knowing whether other persons must be evacuated in case of a dangerous accident may be useful.

Figure 2:
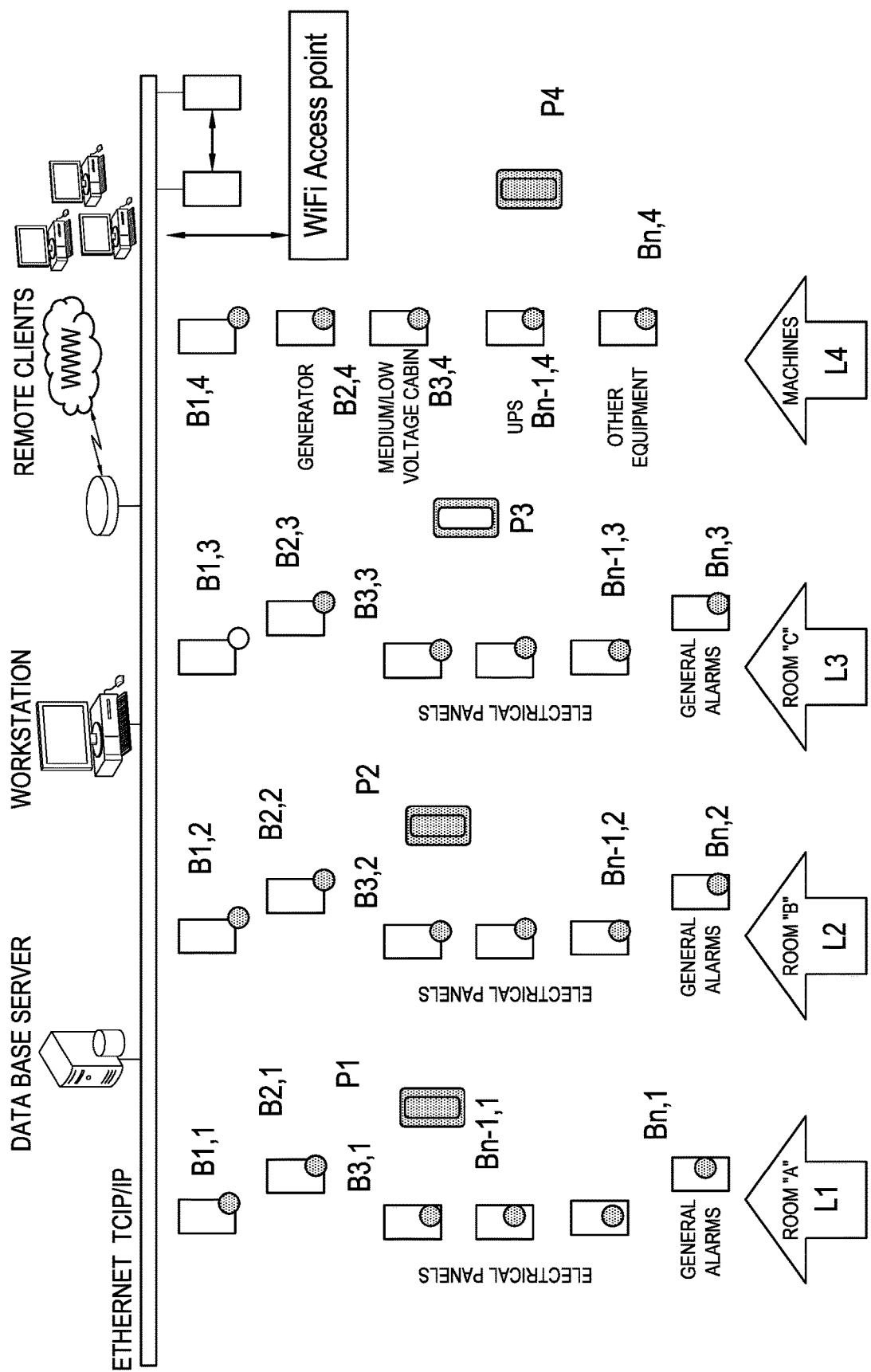
Figure 3:
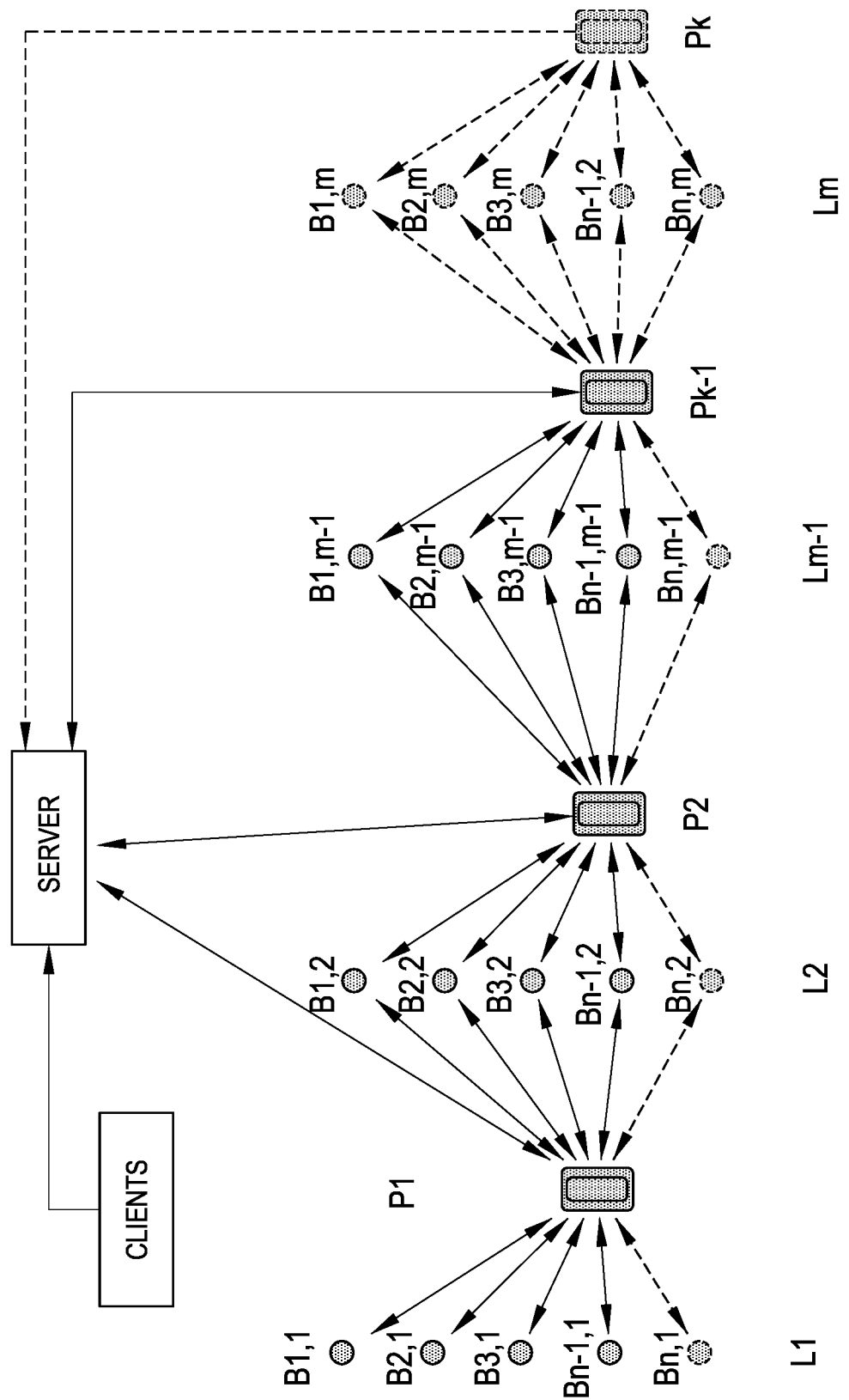
Figure 4:
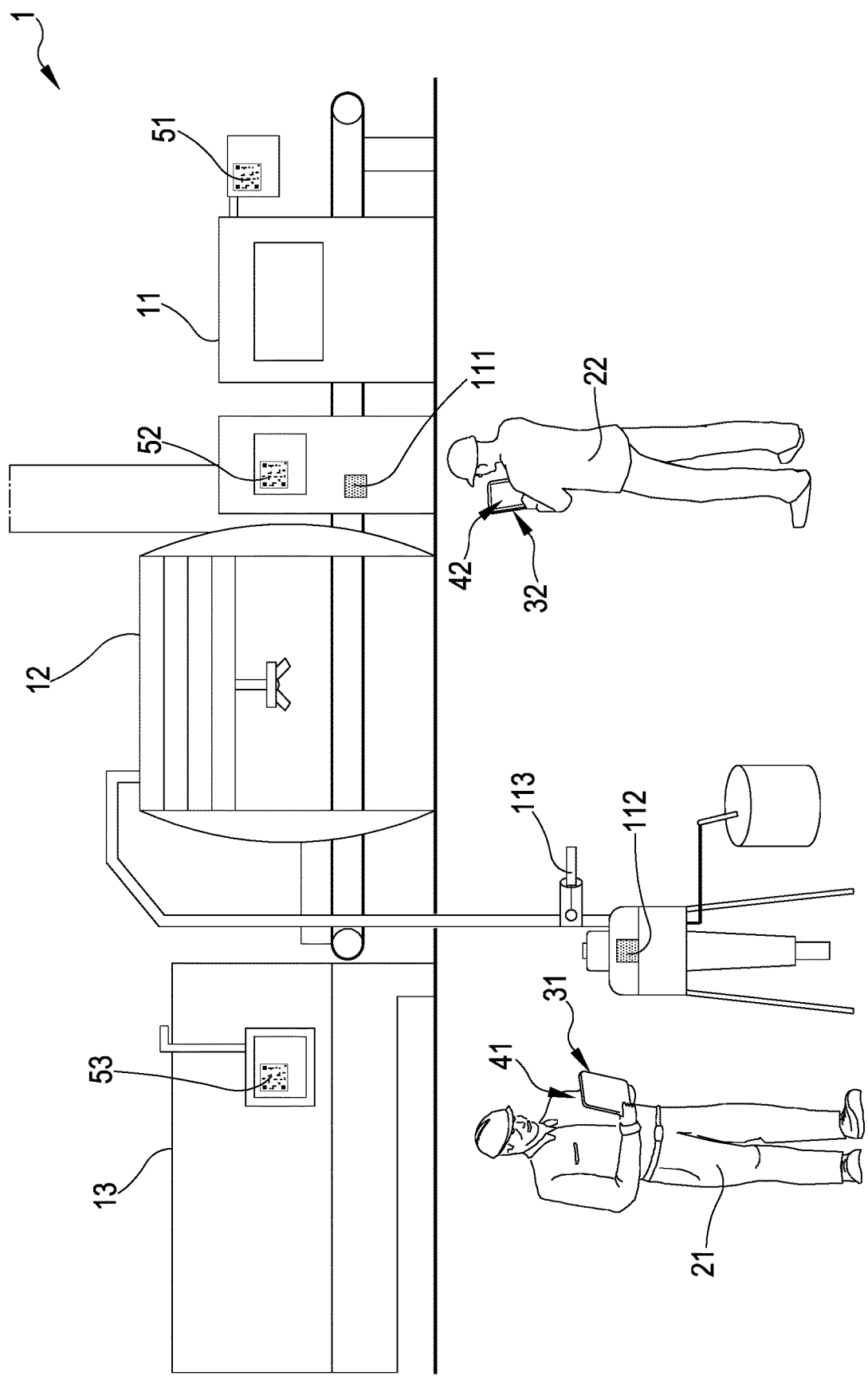
Figure 5:
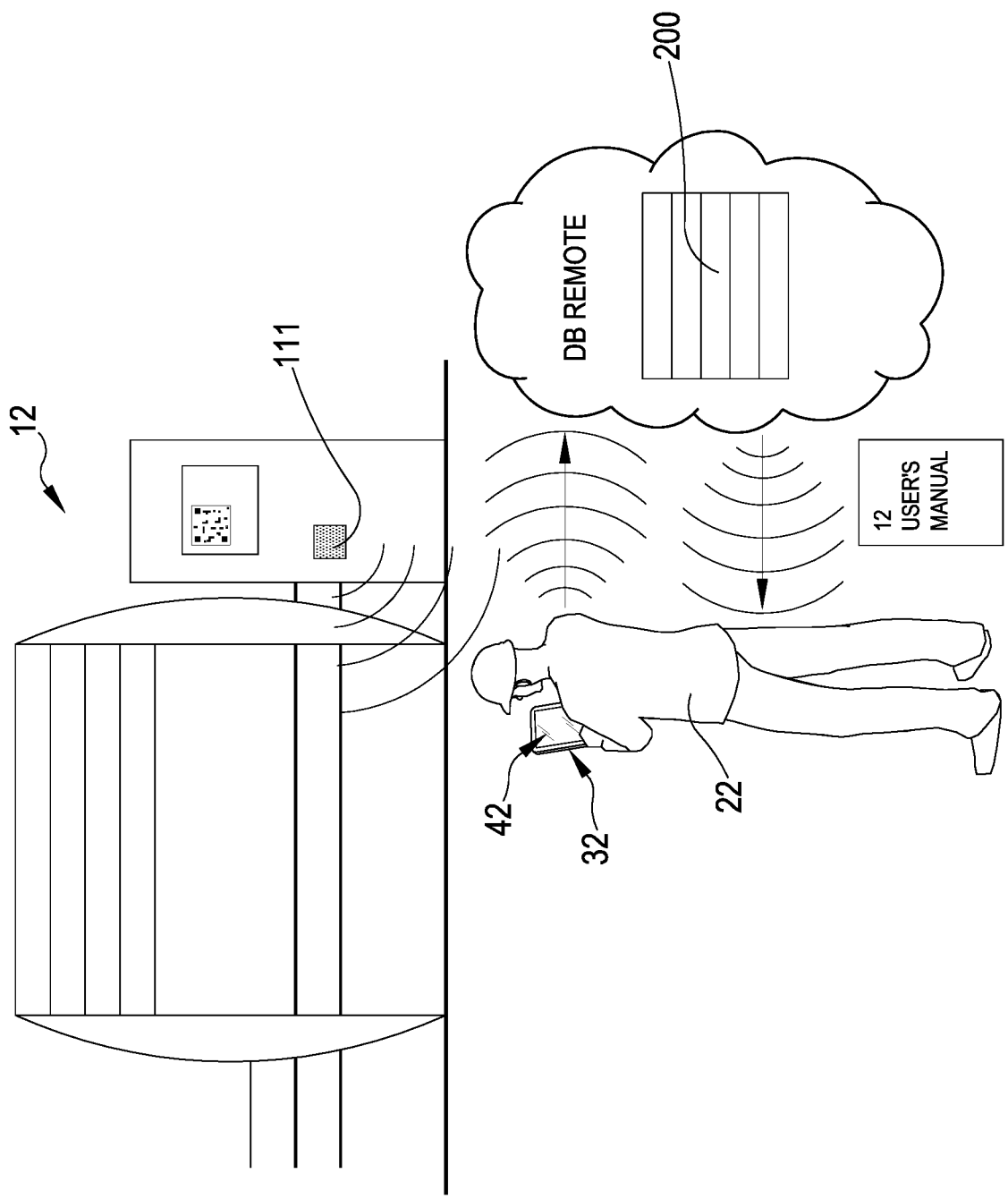
Figure 6:
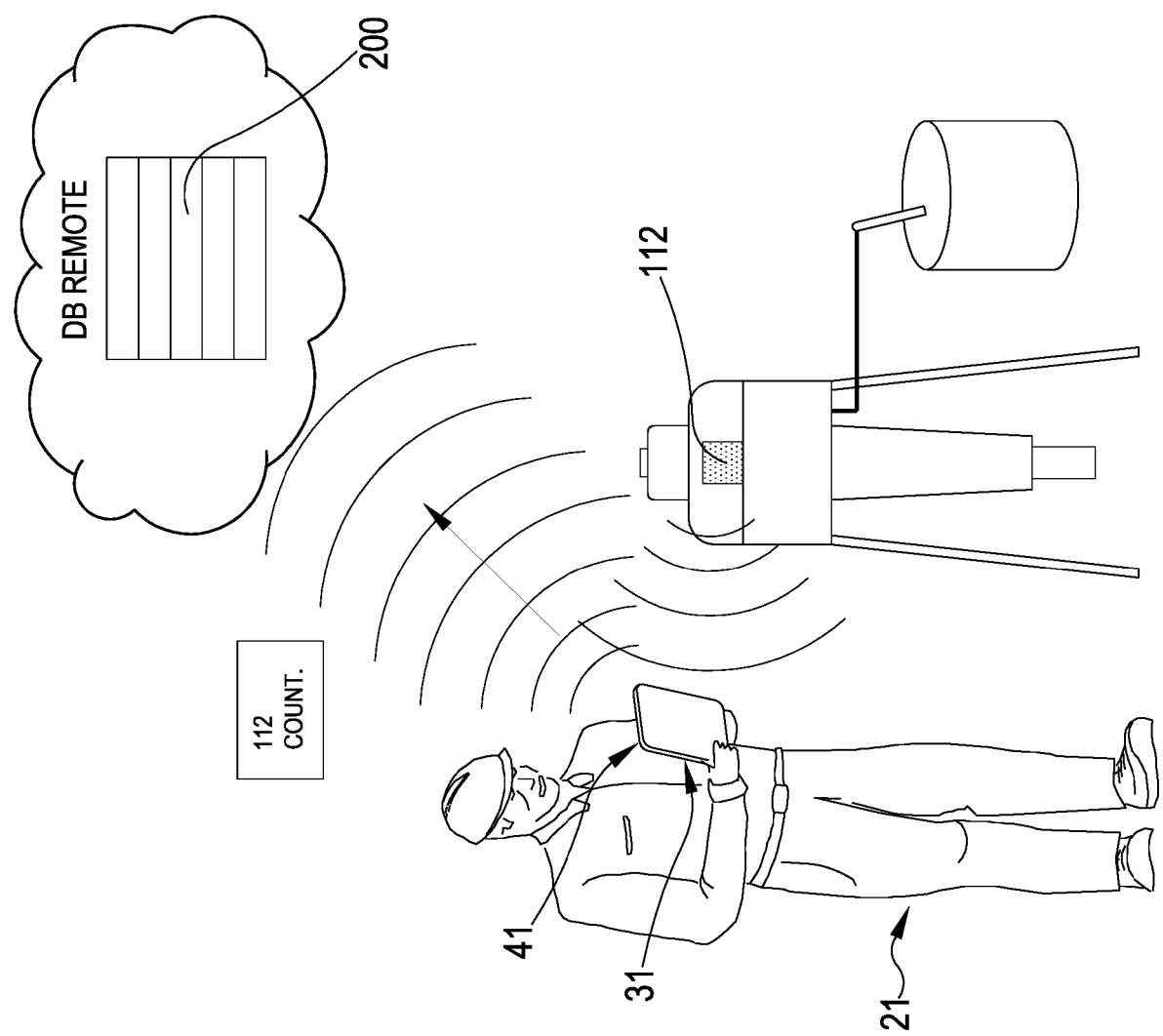
Figure 7:
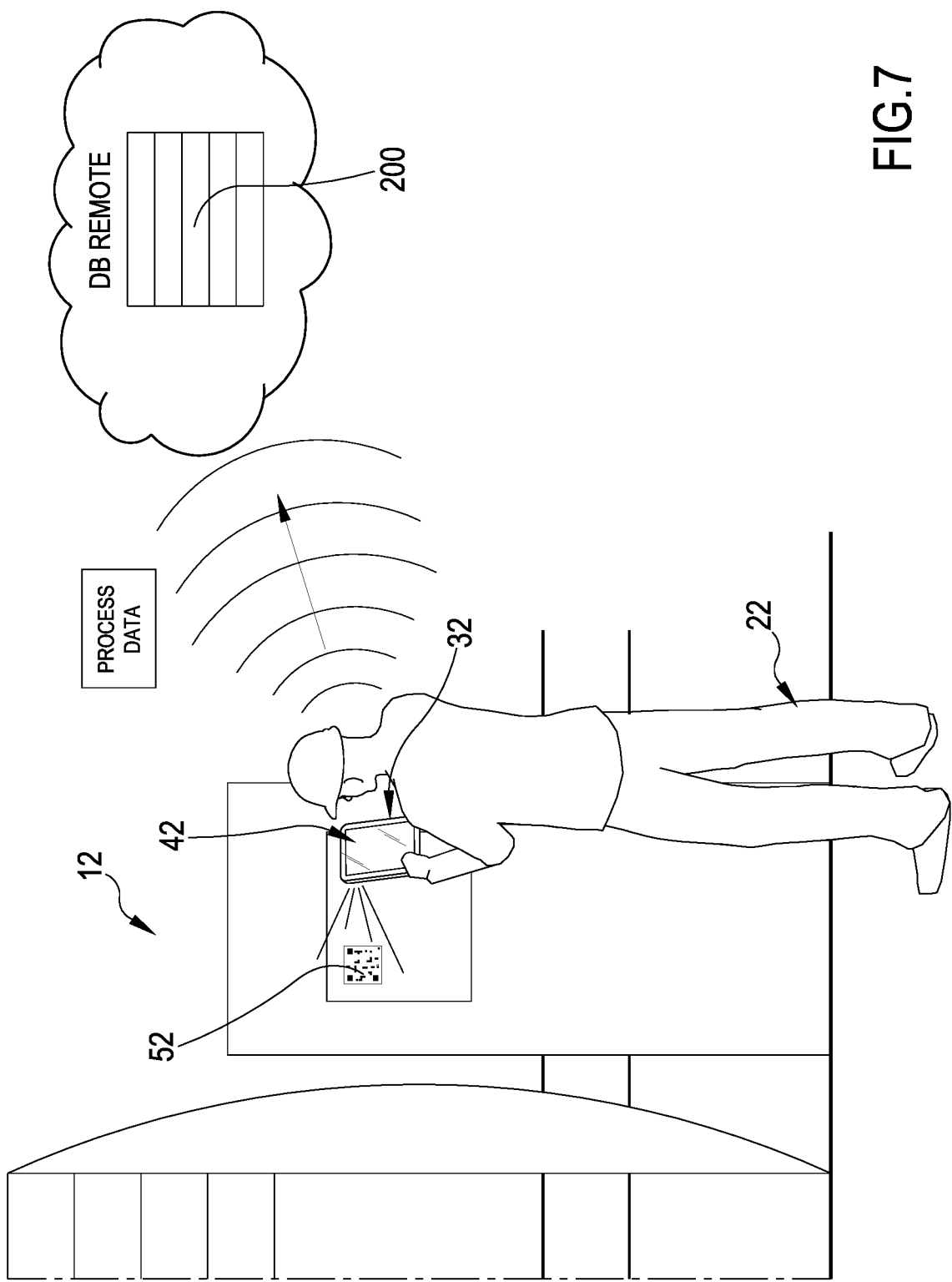

Further advantages and properties of the present invention are disclosed in the following description, in which exemplary embodiments of the present invention are explained in detail based on the drawings:

FIG. 1 Schematic representation of the state of the art;

FIG. 2 Represents the scheme of FIG. 1 modified according to the present invention;

FIG. 3 Scheme representing the system principle according to the present invention, wherein the difference with respect to a traditional client-server system is highlighted; in the traditional architecture the operating machines of the line work with their PLC like the clients of a network;

FIG. 4 Schematic representation of a plant for applying a coating;

FIG. 5 Schematic representation of the gathering of data by operators through beacon sensors;

FIG. 6 Schematic representation of data exchange between the app loaded on the portable device of an operator and Bluetooth® sensors;

FIG. 7 Schematic representation of data gathering by operators through scanning of barcodes/QR codes of apparatuses, or barcodes/QR codes present on other object used in the plant;

FIG. 8 Schematic representation of data gathering by operators through scanning of barcodes on apparatuses/objects.

FIG. 1 shows an outline of the present state of the art, wherein each room (A, B, C) has an architecture of data gathering totally separated from the other rooms. Connecting the apparatuses to obtain information requires heavy investments in hardware and software.

FIG. 2 shows the same scheme modified according to the principles of the present invention. In this scheme, the operating units of the different lines L1, L2, L3, L4 are not provided each with a computerized control system connected in a network, which overall is under the control of a program performed by a server. The computerized control system of the operating units communicates with one or more mobile control units P1, P2, P3, P4. At least one of these units is associated to its corresponding line. Said units can be a unique identical unit, or a plurality of mobile units. Each unit receives from the operating groups of the different lines L1, L2, L3, L4 information about the operating conditions, the set configuration parameters or diagnostic conditions through a transmission unit in the form of a so-called beacon. The control program of the operating units is performed by a dedicated processor for each operating unit, which is not intended to communicate through a network directly to a control server, but transmits data to said mobile devices P1, P2, P3, P4, to all of them or only some of the, and receives setting data of the operating parameters.

Many variations are possible, and many management modes of the communication and of the qualification of said mobile devices P1, P2, P3, P4 to perform given command and/or control activities, thanks to the reading of the data provided by the different beacons B1,1, B2,1, B3,1, B4,1, . . . , B1,$n$, B2,$n$, B3,$n$, B4,$n$, and to the sending of setting data. As will appear in the following, advantageously the channels of beacon configuration can be used to transmit to the control processors of the different operating system, without the need of adding weight from the hardware and software point of view.

From the above, it is apparent that the single operating unit can have control unit that are less onerous in their hardware. Moreover, the possible continual upgrading or servicing of the control program performing the dialogue of the operating unit in the single lines and within the lines according to the workflow pre-set for the production activity under course is greatly simplified.

The sundry mobile devices P1, P2, P3, P4 are wirelessly connected to at least one server cooperating with them, both for the access to operating functions residing at least partially in the server itself, and for a centralized control of the different management activities delegated to mobile devices.

FIG. 3 is a generalization of the example of FIG. 2, and shows that an interaction of a plurality of lines with the same mobile unit can work. From this scheme it is clear that the system according to the present invention breaks the traditional client/server architecture. Here intelligence is distributed according to a different scheme, wherein local networks among operating units of a line do not control the line anymore, making reference to a server through a wired network, but the operating unit control functions only, transferring the setting of the synchronized parameters activities in a workflow to local mobile units, which in their turn cooperate with a server.

FIG. 4 shows a typical line 1 for applying a coating to a part according to the present invention. Said line 1 comprises a plurality of apparatuses, generally arranged in series; e.g. in FIG. 4, an apparatus 11 for pre-treating parts, an apparatus 12 for spraying a coating through a robot, an oven 13 for drying the applied coating.

In said coating line 1, there is provided a plurality of beacon sensors: e.g. a first beacon 111 is placed on apparatus 11, a second beacon 112 is placed on a pump of a liquid to apply, a third beacon 113 is connected to the piping for channelling said liquid to sprayer 12. Each beacon 111, 112, 113, . . . is characterized by its unique identifier, and transmits information visible by all the personal devices 31, 32, 33 . . . of operators 21, 22, . . . which enter into the area of transmission of a given beacon. Beacon sensors 111, 112, 113 . . . allow to correctly localize the personal portable devices (smartphone, tablet, or other kinds of devices) of operators 21, 22 on which an app with location-based functions is loaded.

On each portable personal device 31, 32 an app 41, 42 is loaded.

In the present invention, the personal devices 31, 32, . . . of operators 21, 22, . . . , on which devices an app 41, 42, . . . is loaded, work as concentrators.

Said app 41, 42 can exchange data through a private Wi-Fi network or through a wireless public 2*g*, 3*g*, 4*g*, etc. network, connecting to a remote databank (cloud), having the suitable reading and writing right of access.

In this context, cloud indicates a type of Internet-based computing that provides shared computer processing resources and data to computers and other devices on demand. It is a model for enabling ubiquitous, on-demand access to a shared pool of configurable computing resources (e.g., computer networks, servers, storage, applications and services), which can be rapidly provisioned and released with minimal management effort.

In detail, said app 41, 42 can transmit to remote cloud database 200 the information gathered from personal devices 31, 32, . . . coming from beacon sensors 111, 112, 113, . . . or from apparatuses through scanning of the barcodes/QR codes 51, 52, 53 present on them, or directly acquired from the camera of the personal devices 31, 32 or from scanning barcode 121 (FIG. 8) through the same camera. The successful delivery of signals coming from beacons 111, 112, 113 proves that the transferred data relate to the plant 1 and not to another plant.

If portable personal devices 31, 32 have an active geolocation system, said app 41, 42 can transfer to the remote cloud database 200 the geographical position of the plant, too, and the information relating to its productive status.

FIG. 5 shows an operator 21 connecting to remote cloud 200; said operator can visualize the geographical position of all the plants that adopted this technology and their productive status.

In parallel, an operator 21, provided with a personal device 31 on which an app 41 is loaded, can perform a query in the remote server 200 in order to receive information, as will be better explained in the following.

A beacon sensor 111 placed on apparatus 12 can make public to all the operators provided with said app the working status of the apparatus itself (pausing machine, working machine, machine undergoing an emergency, etc.).

As shown in FIG. 5, the operator 31, localized according to context by beacon sensor 111 as placed in front of apparatus 12, can easily download context-aware contents, i.e. the contents related to apparatus 12: e.g. user's manual, spare parts manual, service instructions for, etc.

In the same way, the operators 21, 22 in proximity to one of the apparatuses 11, 12, 13 can consult with great ease the documentation relating to the apparatuses to which they are near.

In the line 1 there are provided beacon sensors 111, 112, 113, . . . in particular relevant points, transmitting information according to an advertising modality.

It is worth mentioning that the normal working of a beacon consists in transmitting with a pre-determined periodicity data relating to its unique identifier (this modality is called advertising). Furthermore, the beacon can transmit also information relating to the data recorded by sensors.

In fact, beacons 111, 112, 113, . . . can be provided with a wide range of sensors, like temperature, vibration, inclination sensors, magnetometers, etc.; it is known that measuring vibrations can help to diagnostic failures in apparatuses, even in an early phase.

As shown in FIG. 6, approaching to Bluetooth® sensors, the app 41, 42 loaded on personal devices 31, 32, in addition to gathering the information transmitted according to advertising mode, can open a data connection with the beacon sensor, for a wider data exchange, as above explained.

As shown in FIG. 7, each apparatus 11, 12, 13 provided with a graphical interface shows on its first page a bar code/QR code 51, 52, 53, . . . which periodically updates the visualization of statistics and data relating to production status.

A QR code (abbreviation of Quick Response Code) is a two-dimensional bar code (or 2D code), or a matrix code, consisting of black squares arranged in a square grid on a white background. It is used to memorize information generally intended to be read by an imaging device such as a camera present in a cell phone or a smartphone. In a single cryptogram there are provided up to 7.089 numeric characters or 4.296 alphanumeric characters. Generally, the matrix format is of 29×29 little squares.

E.g. the scanning of a bar code/QR code 51, 52, 53, . . . placed e.g. on apparatus 12 or on the parts which underwent coating inside plant 1 allows to gather information on the statistics of number of parts and square meters produced by the apparatus in a unit of time.

It is worthwhile mentioning that on the operator interface display of the single apparatus 11, 12, 13 a dynamic QR code is visualized, automatically updating over time, containing the data relating to the statistics of the apparatus. The operator 21, 22 can read said QR code with the camera present in her/his personal device 31, 32. This configuration allows to prevent the need of hardware wiring in plant 1, and from plant 1 towards portable device 31, 32.

The data visualized in QR Code 51, 52, 53 can be available in an encrypted form, so that they can be interpreted and saved only by someone having explicit rights to perform this operation. The decryption operation can take place directly in the app 41, 42, or even only inside remote cloud 200, accessing through a password or a reserved token.

Said app 41, 42 loaded on the personal device 31, 32 of operator 21, 22 also has the function of camera for scanning barcodes and/or QR code 51, 52, 53.

As shown in FIG. 8, the operator can scan barcodes 121, e.g. of coating liquid cans or diluent cans which arrive into the plant.

Moreover, the operator can scan barcodes/QR codes of the production orders of the parts that undergo the coating treatment.

When the operator 21 does an inspection in the line with her/his personal device 31, immediately the app 41 loaded on her/his personal device 31 receives all the information from beacon sensor 111, 112, 113, . . . which were enabled by her/his app 41 and can perform a data exchange with remote server 200.

Every time the operator scans a bar code and/or a QR code, said app updates the databank on cloud 200.

In this way, a remote user, e.g. the administrative department, can know the progress of the working, simply consulting remote cloud 200.

In relation to the disclosed QR-code or barcode, according to the present invention other kinds of codes can be used. One special code consists in the alphanumeric strings coding the information and the data values in a human intelligible language, so that the operator may directly read the data on the display of an apparatus. The decoder executed by the portable device can in this case be a character recognition software, a so-called OCR which transforms the alphanumerical characters in digital signals which can be interpreted and processed by the software executed by the printable devices and/or by the remote server.

Considering the example of the figures it appears that one embodiment of the present invention may be limited to an apparatus having a display on which a graphic or alphanumeric code is displayed. This code is generated by the processor of the control unit of the apparatus which executes a coding algorithm. Although in the case that the apparatus 13 and 11 cannot be connected to a common network each other and/or to a server, reading the graphic codes representing the measured parameters describing the working status of the apparatus by means of the portable device allow easily to integrate the apparatus 11 and 13 in a central monitoring and management process executed by the portable device and/o by a remote server. The network to be configured is in this case only the one connecting the portable devices with the server and in the present examples with a cloud.

As it appears by saving the monitored data in the cloud advantages are also provided consisting in a remote monitoring by way of the producer or maintenance services of the apparatus in the plant. Furthermore the same ones can also be able to monitor the development level of the apparatus and suggest new upgrades when these are available. Furthermore the monitoring data in the cloud allow the organisations producing and or carrying out maintenance of the apparatus to analyse the use which the clients makes of the apparatus in the plant and to help in modifying or integrating the plant with devices or add-ons in order to optimize the functionality and efficiency of the plant in relation to the mode of use followed by the client.

1 Coating plant
11 First apparatus
12 Second apparatus
13 Third apparatus
21 First operator
22 Second operator
31 Portable device of first operator
32 Portable device of second operator
41 App on the portable device of first operator
42 App on the portable device of second operator
51 QR code on first apparatus
52 QR code on second apparatus
53 QR code on third apparatus
111 First beacon sensor
112 Second beacon sensor
113 Third beacon sensor
121 Barcode
200 Cloud
P1, . . . , Pk−1, Pk Mobile units
B1,1 B1,*m*−1, B1,*m* Beacons
L1, . . . Lm Production lines

The invention claimed is:

1. A plant for manufacturing, including a plant for applying a coating on parts, comprising:
a plurality of processing lines, each processing line comprising a plurality of operating units,
wherein at least some of the operating units comprise a native control processing unit for controlling operating parameters of a corresponding operating unit, and one or more native status sensors connected to the native control processing unit for monitoring a working status of the corresponding operating unit by measuring values of parameters related to the working status of the corresponding operating unit, the one or more native sensors being connected to the native control processing unit, which collects and stores the values of the measured parameters,
wherein at least some of the native control processing units are connected to a control display that displays the working status of the corresponding operating unit,
wherein at least some of the native control processing units have loaded therein and execute a program coding an instruction for carrying out a calculation algorithm of QR codes or barcodes, the at least some of the native control processing units executing the calculation algorithm of the QR codes or the barcodes starting from representative data of the corresponding operating unit or from information on the working status of the corresponding operating unit, and providing a graphic result after processing on the control display by an operator,
wherein one or more of the operating units are provided with an additional sensor measuring an additional operating parameter which is non-natively provided in the corresponding operating unit,
wherein the additional sensor is connected to a radio-transmitter, the radio-transmitter comprising an electronic module operating according to a Bluetooth® standard to advertise a beacon, the radio-transmitter transmitting, with a pre-set periodicity, a radio signal containing a unique identifier configured to identify the corresponding operating unit,
wherein the radio-transmitter transmits periodically, together with the unique identifier, measurement data of the additional operating parameter recorded by the additional sensor, the beacon including the additional sensor and having a remote setting channel via radio-frequency communication with an external control device, enabling the beacon and the external control device to exchange data packets, and
wherein the external control device is configured as a portable device adapted to be carried by the operator and receiving the radio signal transmitted by the radio-transmitter;
a program loaded on and performed by the portable device, the program being configured to extract a univocal unique identifier of one of the operating units and detect a distance between the operator and the one of operating units through an analysis of features characterizing the radio signal, the features including an intensity of the radio signal;
a connecting procedure between the portable device and the radio-frequency transmitting device, the connecting procedure enabling a reception of the measurement data of the additional operating parameter recorded by the additional sensor; and
wherein each portable device comprises a camera or sensor configured to scan the QR codes or the barcodes on the control display of the at least some of the operating units, and acquire the visualized graphical result representing information on the representative data of the at least some of the operating units or the information related to the working status of the operating units through a click of the camera or sensor, and
wherein the information on the representative data of the at least some of the operating units and the information relating to the working status of the at least some of the operating units, and the measurement data coded in the QR codes or the barcodes, and the measurement data of the additional operating parameter about the working status of the corresponding operating unit measured by the additional sensor connected to the radio-transmitter is transmitted by the portable device to a remote server or a cloud, for central common monitoring and management of working conditions of the at least some of the operating units in the plant through a wireless network connection of the portable device with the remote server or the cloud.

2. The plant according to claim 1, wherein the portable device provided with the program determines a position of the operator associated with or wearing the portable device through data obtained from an analysis of an intensity of the radio signal received from the radio-transmitter.

3. The plant according to claim 1, wherein the portable device comprises the camera for scanning the QR codes or the barcodes placed on the operating units, on parts, on production orders of a material to to-be coated, or on consumables with which the operating units are supplied.

4. A method of correlating information about operation a plant according to claim 1 and comprising at least a radio-transmitter which is connected to an additional sensor non natively provided in an operating unit of a processing line of a plurality of lines provided in the plant, the additional sensor being measuring at least one additional control parameter of the operating unit in the processing line, the at least one additional control parameter being a non-natively monitored control parameter by a control processing unit of the operating unit in the processing line, a radio-transmitter and the additional sensor being applied to the operating unit, the method comprising the steps of:
 providing the operating unit with a communication unit of natively monitored parameters representing an operating condition, which codifies the information in a QR code or in a barcode, and display the information with a visualization device of the QR code or the barcode;
 collecting information from different operating units of the line that are not electrically connected to each other or not communicating with each other, to monitor the operating condition of the plant by reading with a portable device the QR-code or the barcode displayed on a display of each operating unit;
 detecting a presence of an operator with a portable device associated to the operator through an interaction between the radio-transmitter and the portable device, a control program being loaded on the portable device, the portable device being configured to perform a program that extracts a unique identifier of the operating unit and the additional control parameter of the operating unit and measured data of the additional control parameter of the operating unit;
 reading and interpreting the QR code by the portable device performing the control program, the control program configuring the portable device so that a detected QR code is acquired and interpreted and the additional control parameter of the operating unit is combined with data coded in the QR code or in the barcode;
 causing the portable device or a cloud server connected thereto, to use information acquired through the QR code or the barcode together with the additional control parameter and the unique identifier of the operating unit to generate command and configuration signals for each operating unit of the line; and
 transmitting the command and configuration signals selectively to the operating unit through a wireless receiving unit or the portable device.

5. The method according to claim 4, wherein the radio-transmitter is a beacon, wherein the unique identifier of the operating unit is coded in an advertising message transmitted continuously or iteratively by the beacon, wherein the command and configuration signals are transmitted to the operating unit through the beacon by exploiting, as a receiving channel of the command and configuring signals, a channel of configuration of the radio-transmitter, working through a radio connection and an output port of the radio-transmitter to interface a configuration channel with the radio-transmitter of the operating unit.

6. The method according to claim 5, wherein the operating unit processes calculation algorithms of the QR codes or the barcodes starting from representative data of the operating unit or from information related to an operating status measured by a native sensor of the operating unit, and then visualizes a graphical result of a processing on the operator's interface, so that each portable device comprising a camera or sensor configured to scan the QR codes or the barcodes is able to acquire information through a click of the camera or sensor.

7. The method according to claim 5, wherein the portable device is configured to adjust a set-up of the operating units through operator input.

8. The plant according to claim 1, in which the native control processing unit of at least one of the operating units is provided with a receiver for receiving the radio signal transmitted by the radio-transmitter coupled with the additional sensor, the native control processing unit executing a second program coding instructions for adding the one or more measured additional non-natively monitored working status parameters to the parameters on the working status that are the natively monitored of the at least one of the operating units, the one or more additional non-natively monitored working status parameters being represented together with the parameters on the working status that are natively monitored in a same QR-code or barcode representation displayed on the display of the native control processing unit of the at least one of the operating units.

9. An operating unit for carrying out a manufacturing operation, the operating unit comprising:
 a control unit comprising a processor configured to execute a control program loaded therein, a user-input interface, and a display; and
 one or more natively provided sensors configured to measure parameters representative of an operating status of the operating unit,
 wherein the control unit further comprises a generator of a graphic code representing parameters measured by native sensors of the operating unit, the graphic code being displayed on the display,
 wherein the operating unit is configured to connect to a portable device comprising a camera or a sensor for scanning the graphic code that is displayed,
 wherein the portable device comprises a graphic code encoder to interpret the graphic code and extract a measured parameter,
 wherein the portable device, a remote server, or a cloud server comprises a processor configured to analyze the measured parameter after extraction and to generate commands or configuration controls of the operating unit as a function of the measured parameter, and
 wherein the portable device is wirelessly connected to the remote server or the cloud by a wireless communication network,
 wherein the operating unit is combined with a non-natively provided sensor for measuring one non natively monitored status parameter, wherein the non-natively provided sensor is connected to a radio-transmitter communicating with the portable device or with the control unit, and wherein the portable device transmits to the remote server the natively measured parameters coded in a QR code or in a bar code together with the additional control parameter received from the radio-transmitter.

10. The operating unit according to claim 9, further comprising a radio-transmitter transmitting continuously or cyclically a message comprising identification data of the operating unit to which the radio-transmitter is associated, the portable device being provided with a program configured to determine a position of the portable device and of an operator associated with or wearing the portable device through data obtained from an analysis of an intensity of a signal carrying a message received from the radio-transmitter.

11. The operating unit according to claim 10, wherein the radio-transmitter comprises one or more sensors configured to measure parameters representative of the operating status of the operating unit in addition to parameters measured by the native sensors of the operating unit, values of measured parameters being sent to the portable device and being included in the message transmitted by the radio-transmitter, the portable device analyzing the additional parameters received from the radio-transmitter and generating commands or configuration controls of the operating unit as a function of the additional parameters, and the portable device transmitting the additional parameters received from the radio-transmitter and an operating unit identification code to a cloud server, or the commands or the configuration controls being generated at least in part by the cloud server as a function of the additional parameters and then being transmitted to the portable device for input in the control unit of the operating unit.

12. The operating unit according to claim 11, wherein the one or more sensors connected to the radio-transmitter are selected from the group consisting of sensors detecting environment conditions, vibration sensors, inclination sensors, and magnetometers.

13. The operating unit according to claim 10, wherein the radio-transmitter not in communication with the operating unit and commands or configuration controls are inputted by the operator manually with a user-input interface of the control unit of the operating unit.

14. The operating unit according to claim 10, wherein the radio-transmitter is connected by a communication link with the operating unit and commands or configuration controls are inputted by the operator through the portable unit.

15. The operating unit according to claim 14, wherein the radio-transmitter is a beacon and command or configuration signals are transmitted to the operating unit through the beacon by exploiting, as receiving channel of the command or configuring signals, a channel of configuration of the radio-transmitter operating through a radio connection and an output port of the radio-transmitter to interface a configuration channel with the radio-transmitter of the operating unit.

16. The operating unit according to claim 9, wherein the graphic code is selected from the group consisting of a QR-code, a barcode, an alphanumeric representation of names of the parameters and of corresponding measured parameter data, and wherein the portable device is provided with a decoder selected respectively from the group consisting of a QR-code decoder, a barcode decoder, and a character recognition decoder.

17. The operating unit according to claim 9, wherein the portable device is selected from the group consisting of a cell phone, a tablet, a wearable computer device, a notebook, and a handheld computer.

18. The plant according to claim 8, wherein the portable device executes a third program coding instructions for adding the one or more measured additional non-natively monitored working status parameters received from the radio-transmitter to the parameters on the working status that are natively monitored of the same operating unit, and generating a QR-code or barcode representing together the one or more additional non-natively monitored working status parameters with the parameters on the working status that are natively monitored.

* * * * *